United States Patent
Heinonen et al.

(10) Patent No.: US 7,103,359 B1
(45) Date of Patent: Sep. 5, 2006

(54) METHOD AND SYSTEM FOR ACCESS POINT ROAMING

(75) Inventors: Tomi Heinonen, Tampere (FI); Kaisa Nyberg, Helsinki (FI)

(73) Assignee: Nokia Corporation, Espoo (FI)

( * ) Notice: Subject to any disclaimer, the term of this patent is extended or adjusted under 35 U.S.C. 154(b) by 611 days.

(21) Appl. No.: 10/152,824

(22) Filed: May 23, 2002

(51) Int. Cl.
  *H04L 12/28* (2006.01)
  *H04Q 7/38* (2006.01)

(52) U.S. Cl. .................. 455/436; 455/432.1; 455/411; 370/331; 709/245

(58) Field of Classification Search ........ 455/436–440, 455/432.1, 411, 442; 370/331–334, 440
See application file for complete search history.

(56) References Cited

U.S. PATENT DOCUMENTS

| | | | |
|---|---|---|---|
| 5,375,140 A | 12/1994 | Bustamante et al. | 375/1 |
| 5,778,075 A | 7/1998 | Haartsen | |
| 6,006,090 A | 12/1999 | Coleman et al. | |
| 6,246,376 B1 | 6/2001 | Bork et al. | 343/760 |
| 6,360,264 B1 | 3/2002 | Rom | 709/227 |
| 6,370,380 B1* | 4/2002 | Norefors et al. | 455/436 |
| 6,526,034 B1 | 2/2003 | Gorsuch | 370/338 |
| 6,587,680 B1 | 7/2003 | Ala-Laurila et al. | 455/411 |
| 6,633,761 B1* | 10/2003 | Singhal et al. | 455/436 |
| 6,744,753 B1 | 6/2004 | Heinonen et al. | |
| 2001/0024953 A1 | 9/2001 | Balogh | |
| 2001/0048744 A1* | 12/2001 | Kimura | 380/247 |
| 2002/0035699 A1* | 3/2002 | Crosbie | 713/201 |
| 2002/0085719 A1 | 7/2002 | Crosbie | |
| 2002/0132605 A1* | 9/2002 | Smeets et al. | 455/411 |
| 2002/0167965 A1* | 11/2002 | Beasley et al. | 370/465 |
| 2003/0011467 A1* | 1/2003 | Suomela | 340/7.1 |
| 2003/0166397 A1* | 9/2003 | Aura | 455/410 |
| 2004/0006642 A1* | 1/2004 | Jang et al. | 709/245 |

FOREIGN PATENT DOCUMENTS

| | | |
|---|---|---|
| EP | 0 851 633 A2 | 7/1998 |
| EP | 851633 A2 * | 7/1998 |
| WO | WO 01/78246 A1 | 10/2001 |

OTHER PUBLICATIONS

U.S. Appl. No. 10/072,969, filed on Feb. 12, 2002, entitled "Short-Range RF Access Point Design Enabling Services To Master And Slave Mobile Devices," in the name of Tomi Heinonen et al.

(Continued)

*Primary Examiner*—George Eng
*Assistant Examiner*—Brandon J. Miller
(74) *Attorney, Agent, or Firm*—Morgan & Finnegan, LLP

(57) ABSTRACT

Efficient access point roaming techniques involve a terminal device handing over a wireless communications session from a first access point to a second access point. The terminal device establishes a link with the second access point; authenticates the link with the second access point using an alternative access point address and a group key associated with the terminal device; and continues the communications session with the second access point using an address of the second access point. Various alternative access point addresses may be used, such as the address of the first access point, or a random address created by the terminal device during initiation of a prior access point connection. The terminal device may transmit a directive to the second access point to employ the alternative access point address.

42 Claims, 12 Drawing Sheets

OTHER PUBLICATIONS

The Bluetooth Special Interest Group, Specification of The Bluetooth System, vol. 1 & vol. 2, Core and Profiles: Version 1.1, Feb. 22, 2001.

L. Blunk et al., "PPP Extensible Authentication Protocol (EAP)," RFC 2284, Internet Engineering Task Force (IETF), Mar. 1998, downloaded from http://sunsite,cnlab-switch.ch/ftp/doc/stardard/rfc/22xx/2284.

H. Anderson et al., "Protected EAP Protocol (PEAP)," Internet Draft, Feb. 23, 2002, downloaded from http://search.ietf.org/internet-drafts/draft-josefsson-pppext-eap-tls-eap-02.txt.

P. Funk et al., "EAP Tunneled TLS Authentication Protocol (EAP-TTLS)," Internet Draft, Feb., 2002, downloaded from http://search.ietf.org/internet-drafts/draft-ietf-pppext-eap-ttls-01.txt.

H. Haverinen (editor), "EAP SIM Authentication," Internet Draft, Jun. 2002, downloaded from http://search.ietf.org/internet-drafts/draft-haverinen-pppext-eap-sim-05.txt.

U.S. Appl. No. 10/198,153, filed Jul. 19, 2002, Janne J. Kallio.

* cited by examiner

METHOD AND SYSTEM FOR ACCESS POINT ROAMING

FIELD OF THE INVENTION

The present invention relates to wireless communications. More particularly, the present invention relates to roaming techniques in a wireless communications network.

BACKGROUND OF THE INVENTION

Short range wireless systems typically involve devices that have a communications range of one hundred meters or less. To provide communications over long distances, these short range systems often interface with other networks. For example, short range networks may interface with cellular networks, wireline telecommunications networks, and the Internet.

Wireless personal area networks (PANs) and wireless local area networks (LANs) are each types of short range wireless systems. PANs and WLANs typically have the common feature of operating in unlicensed portions of the radio spectrum, usually either in the 2.4 GHz Industrial, Scientific, and Medical (ISM) band or the 5 GHz Unlicensed-National Information Infrastructure (U-NII) band. Examples of wireless local area network technology include the IEEE 802.11 WLAN Standard and the HiperLAN Standard. A well known example of wireless personal area network technology is the Bluetooth Standard.

Bluetooth defines a short-range radio network, originally intended as a cable replacement. It can be used to create ad hoc networks of up to eight devices, where one device is referred to as a master device. The other devices are referred to as slave devices. The slave devices can communicate with the master device and with each other via the master device. The Bluetooth Special Interest Group, *Specification Of The Bluetooth System*, Volumes 1 and 2, Core and Profiles: Version 1.1, Feb. 22, 2001, describes the principles of Bluetooth device operation and communication protocols. This document is incorporated herein by reference in its entirety. The devices operate in the 2.4 GHz radio band reserved for general use by Industrial, Scientific, and Medical (ISM) applications. Bluetooth devices are designed to find other Bluetooth devices within their communications range and to discover what services they offer.

In many communications applications, portable terminal devices communicate with one or more fixed access points. Often, such portable terminal devices can pass in and out of the communications ranges of several access points during a single communications session. The maintenance of such a single communications session requires the terminal devices and access points to support what is known as access point roaming.

Access point roaming occurs when a terminal device performs one or more "handovers." During a handover, an existing communications link with a first access point is terminated, while a new communications link with a second access point is established.

Establishing a new link requires various processes to be performed. For example, in Bluetooth networks, devices perform a process known as paging. Paging establishes an unsecured connection between two devices (e.g., a terminal device and an access point). In addition, when certain security features are desired, terminal devices and access points perform a process known as authentication. Authentication is a process where two devices verify that they both have the same secret key. This secret key can then be used to effect security features, such as link encryption.

A successful authentication process requires that both devices know each other's address. For instance in the case of access point roaming a terminal device must know the new access point's address and the new access point must know the terminal device's address. If this condition is not met, then a process known as pairing must also be performed. Pairing is a procedure where two devices exchange information, such as personal identification numbers (PINs) to establish a common secret key.

Fast access point roaming is desirable. Therefore, it is advantageous to minimize the latencies involved with each handover. Unfortunately, performance of both pairing and authentication is time consuming. In addition, the combination of these processes places large demands on network bandwidth as well as on terminal device and access point processing capacity.

In order to solve some problems associated with access point roaming, the Bluetooth Special Interest Group ("the Bluetooth SIG") has defined a concept known as group keys (also called service access keys). According to this concept, a network of access points maintains a database that can store a terminal's common link key (i.e., its Group Key). These group keys are indexed by the unique address associated with each terminal device.

Each access point in the network can query a group key for a terminal from this database. Alternatively, access points in close proximity can exchange group keys during events such as handovers. The group key concept is attractive because it reduces the complexity involved in maintaining a key database because each terminal has only one link key.

Nevertheless, group keys do not alleviate problems associated with access point roaming. For instance, despite the existence of group keys, a terminal device cannot engage in authentication with a new access point, because the terminal device does not know the new access point's address. Therefore, both pairing and authentication must be performed.

Maintaining a database of access point addresses in each terminal device is one approach to solve this problem. Since typical access point roaming network environments involve an extremely large number of access points, this approach would require each terminal device to have excessively large memory capabilities to store an address for each access point. Accordingly, maintaining such a database is impractical. Therefore, despite the existences of group keys, both pairing and authentication processes need to be performed for each handover.

The Bluetooth SIG has also proposed a concept known as anonymity mode. Anonymity mode is geared to preventing location tracking of terminal devices. In particular, anonymity mode enables a terminal device to initiate another device to change its address. However, anonymity mode has not been proposed for use with access point roaming.

Accordingly, what is needed are techniques for making access point roaming more efficient.

SUMMARY OF THE INVENTION

The present invention is directed to techniques for making access point roaming more efficient. Accordingly, a method of the present invention involves a terminal device handing over a wireless communications session from a first access point to a second access point. The terminal device establishes a link with the second access point; authenticates the link with the second access point using an alternative access point address and a group key associated with the terminal device; and continues the communications session with the second access point using an address of the second access point. Various alternative access point addresses may be used, such as the address of the first access point, or a random address created by the terminal device during initiation of a prior access point connection. The terminal device may transmit a directive to the second access point to employ the alternative access point address.

A further method of the present invention involves a current access point handing over a wireless communications session with a terminal device from a previous access point. The current access point establishes a link with the terminal device; authenticates the link with the terminal device using an alternative access point address and a group key based on a terminal device address; and continues the communications session with the terminal device using an address of the second access point. Various alternative access point addresses may be used, such as the address of the first access point, or a random address created by the terminal device during initiation of a prior access point connection.

The access point may retrieve the group key from a remote database. Also, the access point may receive a handover notification from the first access point. This handover notification may contain various types of information, such as the terminal device address, and the alternative access point address. The access point may interrupt links with one or more other terminal devices for authentication.

In yet a further method of the present invention, a terminal device hands over a wireless communications session from a first access point to a second access point. In particular, the terminal device enters a first coverage area associated with the first access point; establishes a first link with the first access point; authenticates the first link with the first access point using an alternative access point address and a group key associated with the terminal device; and establishes a communications session with the first access point using an address of the first access point. When entering a second coverage area associated with the second access point, the terminal device establishes a second link with the second access point; authenticates the second link with the second access point using the alternative access point address and the group key associated with the terminal device; and continues the communications session with the second access point using an address of the second access point.

In a Bluetooth environment, the present invention may advantageously utilize group keys and anonymity mode to perform these methods.

BRIEF DESCRIPTION OF THE DRAWINGS

In the drawings, like reference numbers generally indicate identical, functionally similar and/or structurally similar elements. The drawing in which an element first appears is indicated by the leftmost digit(s) in the reference number.

The present invention will be described with reference to the accompanying drawings, wherein.

DETAILED DESCRIPTION OF THE PREFERRED EMBODIMENTS

I. Exemplary Operational Environment

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
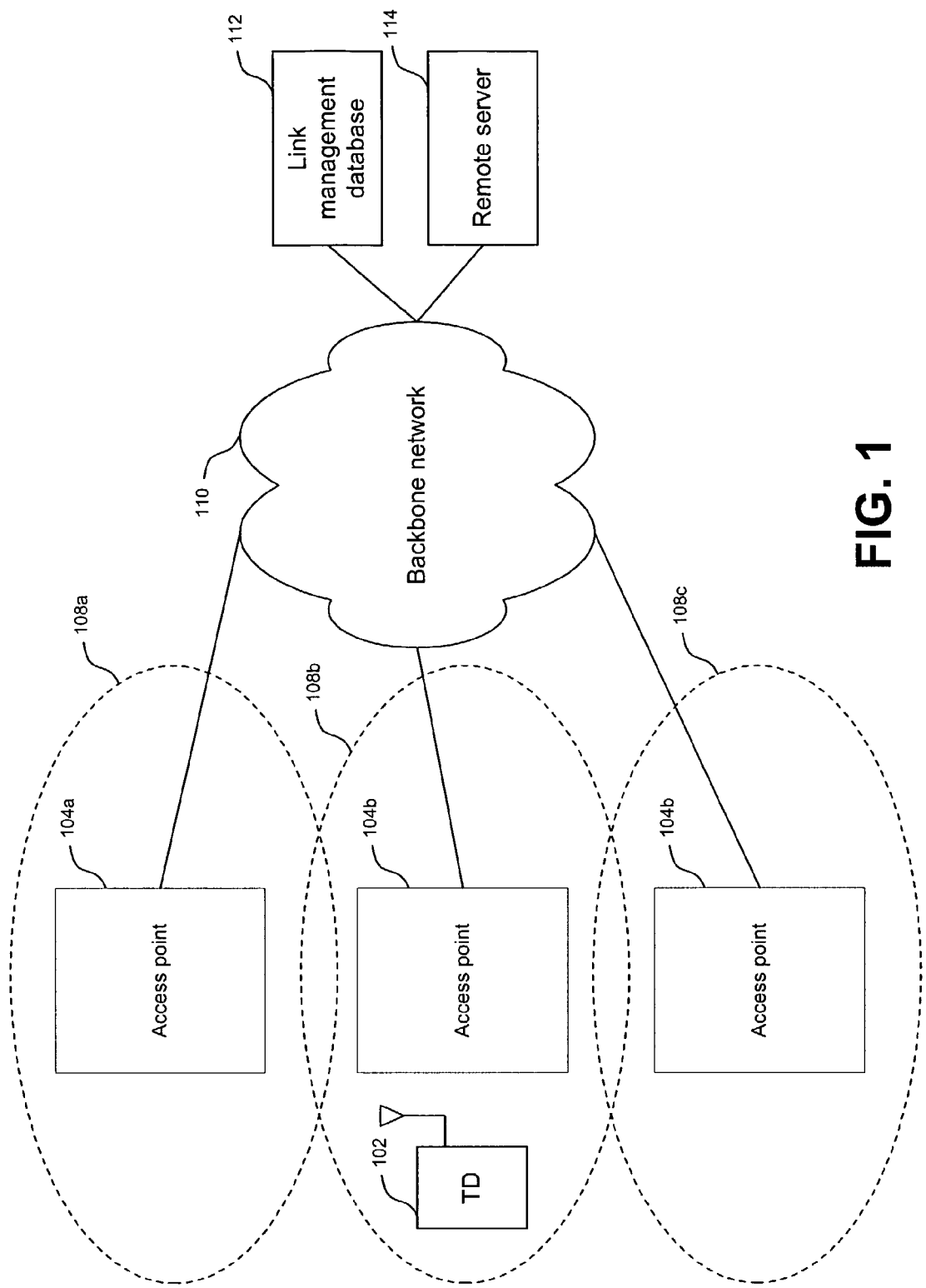
FIG. 1 is a block diagram of an exemplary operational environment.

Before describing the invention in detail, it is helpful to describe an environment in which the invention may be used. Accordingly, FIG. 1 is a block diagram of an operational environment where multiple terminal devices 102 communicate with access points 104 across various ad hoc networks. Communications between these terminals may be performed according to various personal area network (PAN) standards, such as the Bluetooth communications standard.

FIG. 1 shows that each access point 104 has a corresponding coverage area 108. Each of these coverage areas 108 identifies the locations where the corresponding access point 104 may engage in communications with terminals 102. As shown in FIG. 1, coverage area 108a corresponds to access point 104a, coverage area 108b corresponds to access point 104b, and coverage area 108c corresponds to access point 104c. These coverage areas may overlap. For example, coverage area 108a overlaps with coverage area 108b and coverage area 108b overlaps with coverage area 108c.

In many communications applications, terminal devices may be portable. Therefore, they may move through more than one coverage area 108 during the course of a communications session. Such terminal activity is referred to herein as access point roaming (APR). More particularly, the process of a communications session being transferred from a first access point to a second access point is referred to herein as a handover. The present invention provides mechanisms that allow handovers to occur without excessively interrupting ongoing communications sessions.

Each access point 104 is connected to a backbone network 110 (also referred to herein as access point network 110). Backbone network 110 may be implemented with various technologies. For instance, backbone network 110 may include an IP network, such as the Internet. Backbone network 110 may also include telephony networks.

Backbone network 110 allows access points 104 to communicate with each other. Such communications may allow portable terminal devices in different coverage areas to communicate with each other. In addition, backbone network 110 further provides each access point 104 with the ability to retrieve information from common resources, such as a link management database 112. In addition to employing backbone network 110, access points 104 may communicate with each other using Bluetooth links.

Link management database 112 stores group keys for each terminal device 102. These group keys are indexed according to terminal device address. For example, in a Bluetooth environment, the group keys are indexed according to BD_ADDR. Link management database 112 may implemented as a server according to a variety of techniques, as would be apparent to persons skilled in the relevant arts.

Backbone network 110 also enables terminal devices to engage in communications sessions with remote devices. For example, terminal devices may receive information, such as Internet content, from remote server 114. In addition, communications sessions may include other communications services, such as telephony. Such telephony may include connections between terminal devices 104, as well as connections with other devices (not shown). Backbone network 110 facilitates such connections.

II. Exemplary Terminal Device

Figure 2:
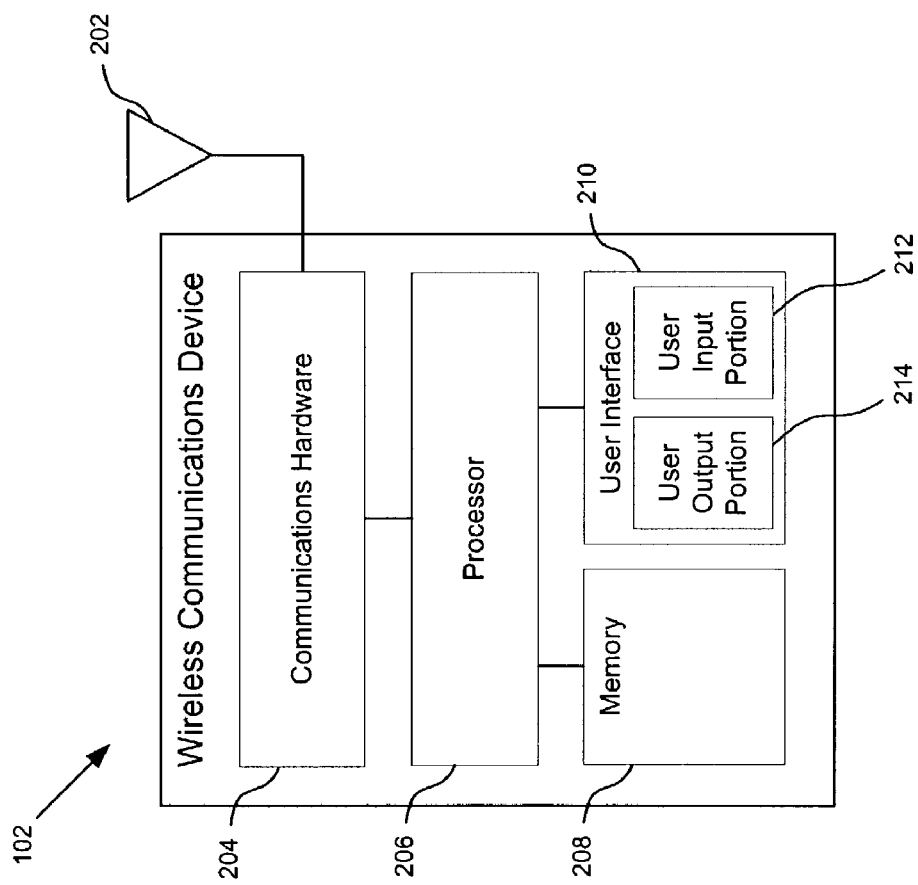
FIG. 2 is a block diagram of an exemplary terminal.

Since the present invention may be employed in environments involving wireless communications, a device capable of engaging in such communications is described. FIG. 2 is a block diagram of an implementation of an exemplary terminal device 102. Terminal device 102 may be a wireless mobile phone, a wireless PDA, a pager, a two-way radio, a smartphone, a personal communicator, a laptop computer equipped with a Bluetooth (BT) module, or other wireless devices apparent to persons skilled in the relevant arts.

FIG. 2 shows that terminal device 102 includes several components. For instance, terminal device 102 includes a communications hardware portion 204 that is coupled to an antenna 202. Communications hardware portion 204 includes electronics, such as a transceiver and a diplexer. These electronics allow terminal device 102 to engage in bi-directional RF communications with network entities, such as base stations and Bluetooth access points.

A processor 206 is coupled to communications hardware portion 204. Processor 206 controls all of the functions of terminal device 106. Processor 206 may be implemented with one or more microprocessors that are each capable of executing software instructions stored in a memory 208.

A user interface 210 is coupled to processor 206. User interface 210 facilitates the exchange of information with a user. FIG. 2 shows that user interface 210 includes a user input portion 212 and a user output portion 214. User input portion 212 may include one or more devices that allow a user to input information. Examples of such devices include keypads, touch screens, and microphones. User output portion 214 allows a user to receive information from terminal device 102. Thus, user output portion 214 may include various devices, such as a display, and one or more audio speakers. Exemplary displays include liquid crystal displays (LCDs), and video displays.

Memory 208 stores information in the form of data and software components. These software components include instructions that can be executed by processor 206. Various types of software components may be stored in memory 208. For instance, memory 208 may store software components that control the operations of communications hardware portion 204, and software components that control the exchange of information through user interface 210. In addition, memory 208 stores software components that are associated with user applications that allow terminal device 102 to engage in communications sessions involving services, such as telephony and remote server access.

The above components may be coupled according to various techniques. One such technique involves coupling communications hardware 204, processor 206, memory 208, and user interface 210 through one or more bus interfaces. In addition, each of these components is coupled to a power source, such as a removable and rechargeable battery pack (not shown).

As described above, memory 208 stores software components that are associated with user applications that allow terminal device 102 to select and receive content items from remote server 104. Since such user applications may involve the exchange of information with remote server 104, memory 208 stores software components that enable communications with remote server 104 according to protocols, such as the Wireless Application Protocol (WAP).

When engaging in WAP communications with remote server 114, terminal device 102 functions as a WAP client. To provide this functionality, terminal device 102 includes WAP client software, such as WAP Client Version 2.0. WAP Client Version 2.0 is a commercially available software product provided by Nokia Corporation of Finland. WAP Client Version 2.0 contains components, such as a Wireless Markup Language (WML) Browser, a WMLScript engine, a Push Subsystem, and a Wireless Protocol Stack.

Application software components stored in memory 208 of terminal device 102 interact with the WAP client software to implement a variety of communications applications. Examples of such communications applications include the reception of Internet-based content, such as headline news, exchange rates, sports results, stock quotes, weather forecasts, multilingual phrase dictionaries, personal online calendars, and online travel and banking services.

WAP-enabled terminal device 102 may access small files called decks which are each composed of smaller pages called cards. Cards are small enough to fit into a small display area that is referred to herein as a microbrowser. The small size of the microbrowser and the small file sizes are suitable for accommodating low memory devices and low-bandwidth communications constraints imposed by the wireless portions of communications networks, such as network 106.

Cards are written in the Wireless Markup Language (WML), which is specifically devised for small screens and one-hand navigation without a keyboard. WML is scaleable so that it is compatible with a wide range of displays that covers two-line text displays, as well as large LCD screens found on devices, such as smart phones, PDAs, and personal communicators.

WML cards may include programs written in WMLScript, which is similar to JavaScript. However, through the elimination of several unnecessary functions found in these other scripting languages, WMLScript makes minimal demands on memory 208 and processor 206.

III. Exemplary Access Point

Figure 3:
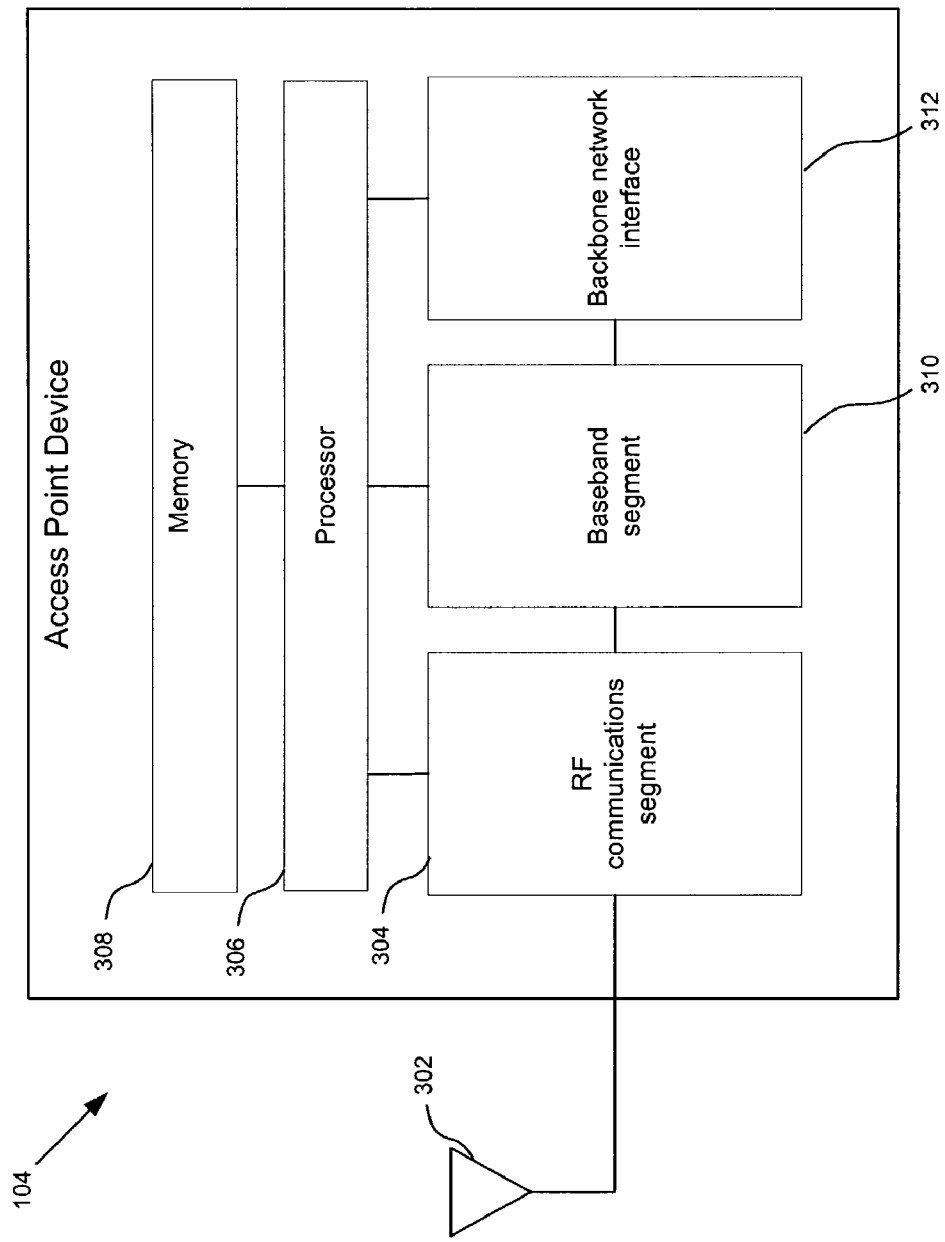
FIG. 3 is a block diagram of an exemplary access point.

FIG. 3 is a block diagram of an implementation of an exemplary access point device 104. FIG. 3 shows that this implementation includes several components. For instance, access point-device 104 includes a radio frequency (RF)

communications portion 304 that is coupled to an antenna 302. RF communications portion 304 includes electronics, such as a transceiver and a diplexer. These electronics allow access point 104 to engage in bi-directional RF communications with terminal devices 104.

A baseband segment 310 is coupled to RF communications portion 304. Baseband segment 310 performs connection processing functions, such as link establishment and termination, as well as security functions, such as authentication, pairing, and encryption. A backbone network interface 312 is coupled to baseband segment 310. Backbone network interface 312 handles communications with other devices across backbone network 110.

A processor 306 is coupled to RF communications portion 304, baseband segment 310, and backbone network interface 312. Processor 306 controls all of the functions of the access point device. Processor 306 may be implemented with one or more microprocessors that are each capable of executing software instructions stored in a memory 308.

Memory 308 stores information in the form of data and software components. These software components include instructions that can be executed by processor 306 to control the operation of the access point device components shown in FIG. 3.

The components shown in FIG. 3 may be coupled according to various techniques. One such technique involves coupling RF communications segment 304, processor 306, and memory 308 through one or more bus interfaces.

IV. Access Point Roaming

Figure 4:
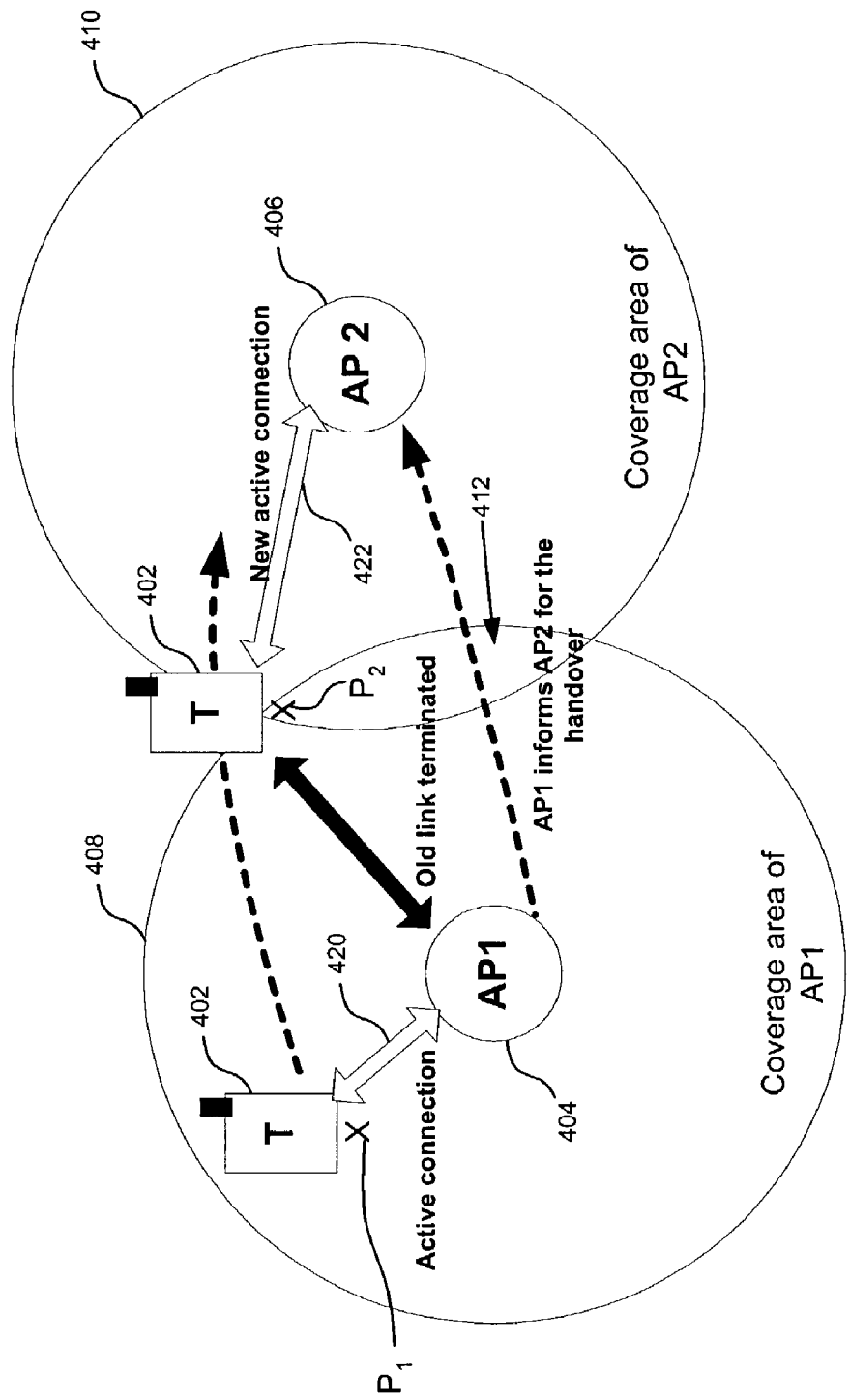
FIG. 4 is a diagram of an exemplary handover scenario.

FIG. 4 is a diagram of an exemplary handover scenario. This scenario involves a first access point 404 and a second access point 406. Each of these access points has a limited coverage area. For instance, access point 404 has a coverage area 408, while access point 406 has a coverage area 410. These coverage areas overlap at a handover region 412.

In this scenario, a terminal device 402 moves from a position $P_1$ to a position $P_2$. As shown in FIG. 4, position $P_1$ is within coverage area 408, while position $P_2$ is within handover region 412 (i.e., $P_2$ is within both coverage areas 408 and 410).

While at position $P_1$, terminal device 402 has a short range wireless communications connection or link 420 with access point 404. During this connection, terminal device 402 is involved in a communications session with one or more other devices. Link 420 continues until terminal device 402 reaches position $P_2$. At this point, connection 420 is terminated, and a new short range wireless connection or link 422 is established and authenticated between terminal device 402 and access point 406. Through link 422, terminal device 402 maintains the communications session previously carried over link 420.

The scenario of FIG. 4 illustrates a second connection being established in a handover region that includes two overlapping coverage areas. However, in other scenarios, second connection 422 may be established after terminal 402 has completely left a first coverage area, and entered a second coverage area.

Figure 5:
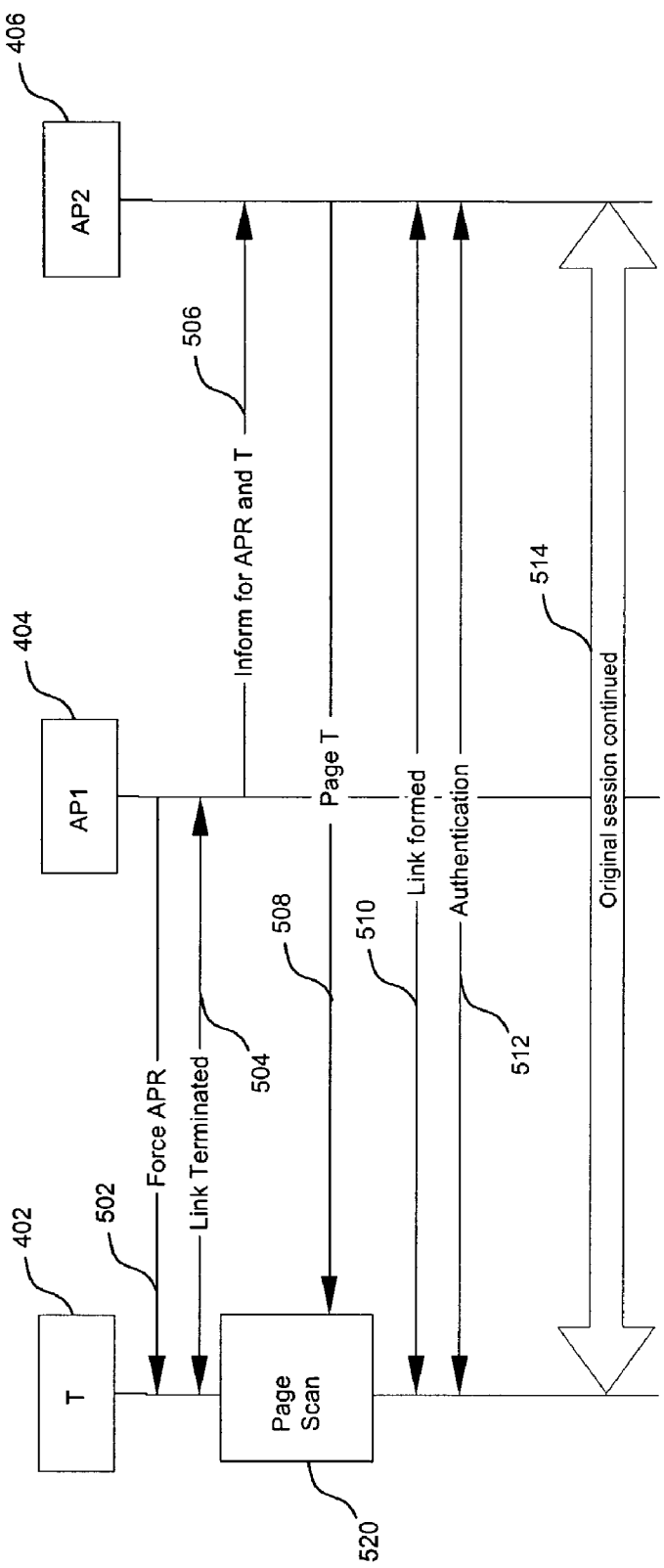
FIG. 5 is a diagram of a signaling sequence in a handover process according to an embodiment of the present invention.

During access point roaming, handover may be either access point initiated or terminal initiated. FIG. 5 is a diagram of a signaling sequence in an access point initiated handover process according to an embodiment of the present invention. More particularly, FIG. 5 illustrates a series of steps that shows how terminal device 402 interacts with access points 404 and 406 during an access point initiated handover. Although this signaling sequence is described with reference to the elements of FIG. 4, this illustrated process may be applied to other scenarios and topologies.

First, in a step 502, access point 404 "forces" an APR handover when terminal device 402 is at point $P_2$. This step comprises access point 404 transmitting a message to terminal device 402 that its link will be terminated. Although FIG. 5 shows access point 404 forcing an APR handover, terminal 402 may initiate the handover. In this case, step 502 comprises terminal 402 sending a message or query to access point 404 for access point roaming.

Next, in a step 504, the link between terminal device 402 and first access point 404 is terminated. Following this termination, terminal device 402 enters a page scan state 520. While in this state, terminal device 402 waits to receive a message containing information based on its address.

In a step 506, access point 404 notifies access point 406 of the pending handover. This step includes providing access point 406 with the address of terminal device 402. Next, in a step 508, access point 406 pages terminal device 402. In the context of Bluetooth, paging is a process that establishes a connection between two devices. With reference to FIG. 4, this process involves the exchange of information between access point 406 and terminal device 402.

More particularly, during this paging process, access point 406 enters a paging mode and transmits one or more paging packets. These paging packets each include an identification number based on the address of terminal device 402. Meanwhile, terminal device 402 (which is in page scan mode) responds to the paging packets by transmitting a packet that includes its address.

Access point 406 receives this packet from terminal device 402. In response, access point 406 transmits a frequency hop synchronization (FHS) packet. The FHS packet is used to pass information that allows terminal device 402 to synchronize with the frequency hopping sequence of access point 406. Upon receipt of this FHS packet, terminal device 402 transmits a further packet to confirm receipt of the FHS packet. Both terminal device 402 and access point 406 enter into the connection state at this point. When in this state, access point 406 operates as a master device and terminal device 402 operates as a slave device.

Upon completion of this paging process, a step 510 is performed. In step 510, a link is formed between terminal device 402 and second access point 406. In particular, terminal device 402 synchronizes its clock to the clock of access point 406. Thus, terminal device 402 employs the timing and frequency hopping sequence of access point 406. Additionally, access point 406 transmits a packet to verify that a link has been set up. Terminal device 402 confirms this link by sending a packet to access point 406.

In a step 512, terminal device 402 and the access point 406 conduct authentication and pairing processes. Next, in a step 514, terminal device 402 continues its communications session.

As set forth above, security features are desired for various types of communications services. Features, such as encryption, require both devices to share an encryption key. Authentication is a security procedure where two devices exchange information to verify that they both have the same encryption key.

If this authentication reveals that the two devices do not share an encryption key, then a process, referred to as pairing is performed. Pairing is a procedure that establishes a link key for use between two devices. As stated above, valuable processing capacity and network bandwidth are consumed when both authentication and pairing processes need to be performed. Valuable time will also be lost when both authentication and pairing processes need to be performed. Adverse consequences may result from this loss of time. For instance, terminal 402 may move out the coverage area of access point 406.

Details of Bluetooth authentication and pairing processes are now described with reference to the flowchart of FIG. 6. This flowchart illustrates that these processes are based on a challenge-response protocol that occurs between a verifier device (such as access point 406) and a claimant device (such as terminal device 402).

Figure 6:
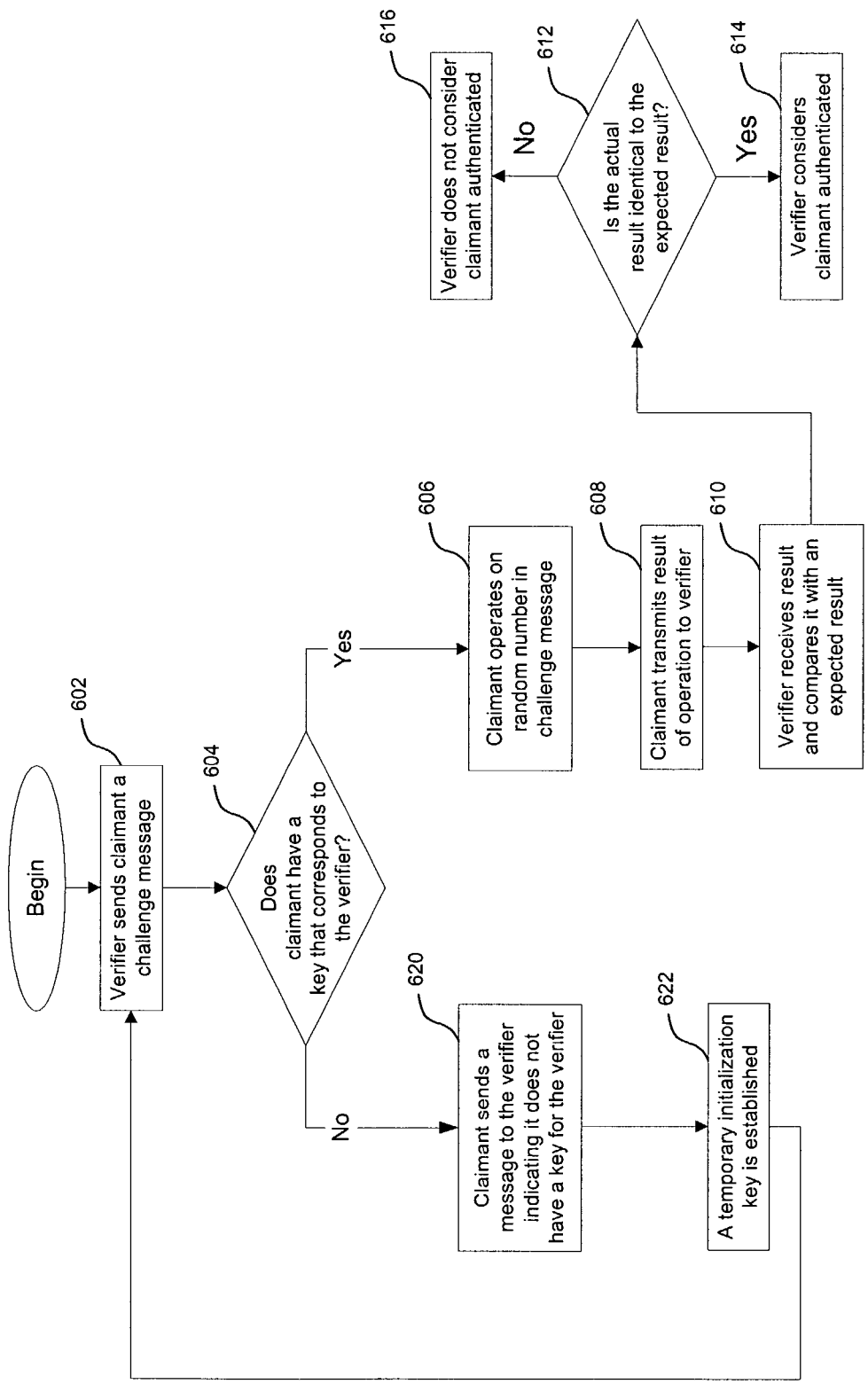
FIG. 6 is a flowchart of an exemplary authentication and pairing process.

The process illustrated in FIG. 6 begins with a step 602, where a verifier challenges a claimant by sending the claimant a challenge message. This challenge message includes a random number. In the context of Bluetooth, this challenge message is in the format of an LMP_au_rand packet and contains a 16-byte random number.

In a step 604, the claimant receives the challenge message and determines whether it has a key that corresponds to the verifier. If so, the authentication process continues and a step 606 is performed. Otherwise, operation proceeds to a step 620, where the pairing process commences.

In step 606, the claimant operates on the random number in the challenge message. Next, in a step 608, the claimant transmits the result of this operation to the verifier. In the context of Bluetooth, this transmission is in the format of an LMP_sres packet.

In a step 610, the verifier receives the result from the claimant and compares it to an expected result. As shown by step 612, if the result is the same as the expected result, operation proceeds to a step 614 where the verifier considers the claimant an authenticated device. Otherwise, operation proceeds to a step 616, where the verifier does not consider the claimant an authenticated device.

As described above, the pairing process commences when the verifier and claimant devices do not have a common link key. Accordingly, if a link key does not exist for a device when a challenge message is received, a pairing process is performed so that a link key may be established between the two devices. Accordingly, step 620 follows step 604 when the claimant determines that it does not have a key that corresponds to the verifier. In step 620, the claimant will respond with a message indicating that it does not have a key for the verifier device. In the context of Bluetooth, this message is an LMP_not_accepted packet.

In a step 622, a temporary initialization key is generated. The initialization key may be generated according to various techniques. For example, this key may be based on a personal identification number (PIN) that is common to both of the pairing devices (i.e., both the verifier and the claimant). Performance of step 622 may be performed without transmitting the PIN and the temporary key between the verifier and the claimant.

Since the verifier and the claimant have established a common key between them, the authentication process may continue. Accordingly, operation returns from step 622 to step 602. However, in the context of Bluetooth, when step 602 is performed after step 622, the verifier transmits the LMP_in_rand packet instead of the LMP_au_rand packet.

Upon completion of the authentication process described with reference to FIG. 6, the two devices may optionally exchange their roles as verifier and claimant and perform authentication in the opposite direction.

As illustrated in FIG. 6, performance of both authentication and pairing is an involved process. The present invention streamlines access point roaming by eliminating the need to perform both authentication and pairing at each handover.

Figure 7:
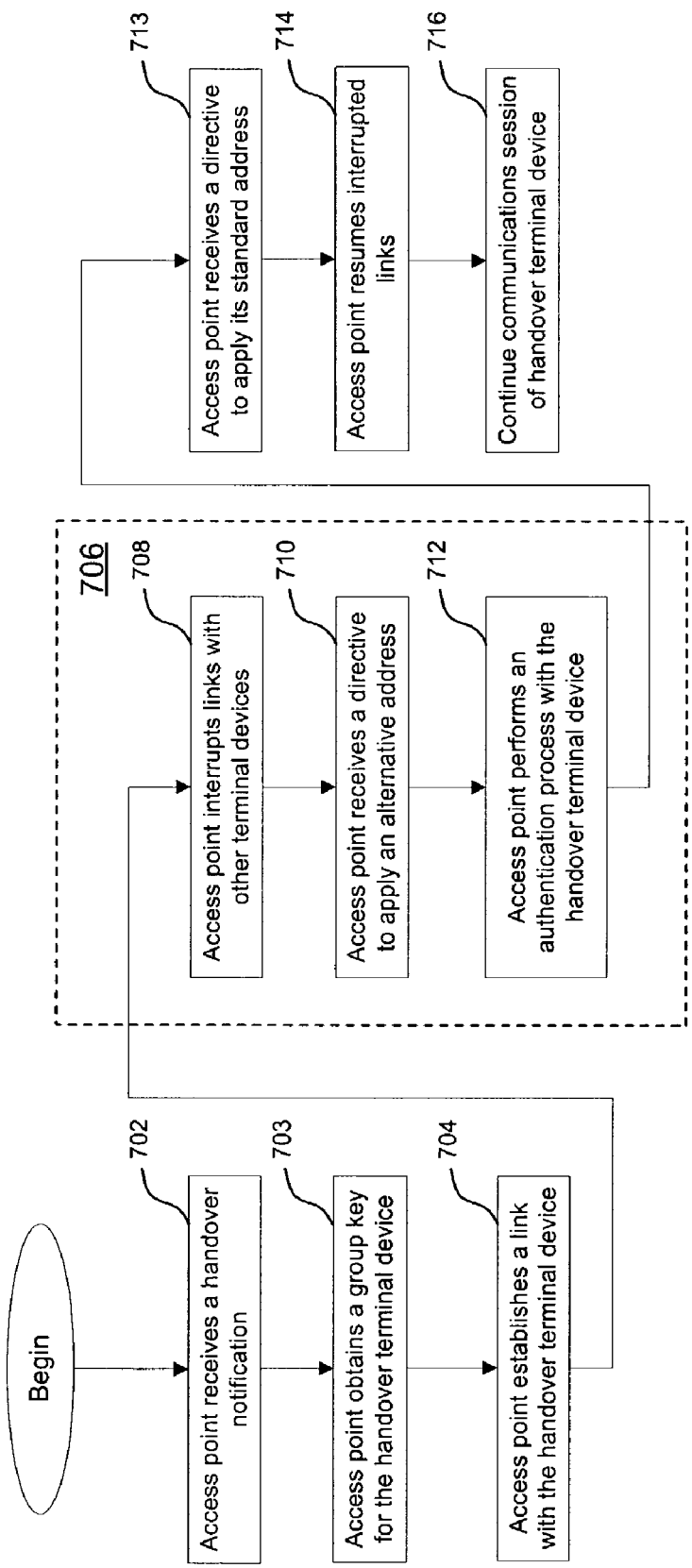
FIG. 7 is a flowchart of a handover operation performed by an access point.
Figure 8:
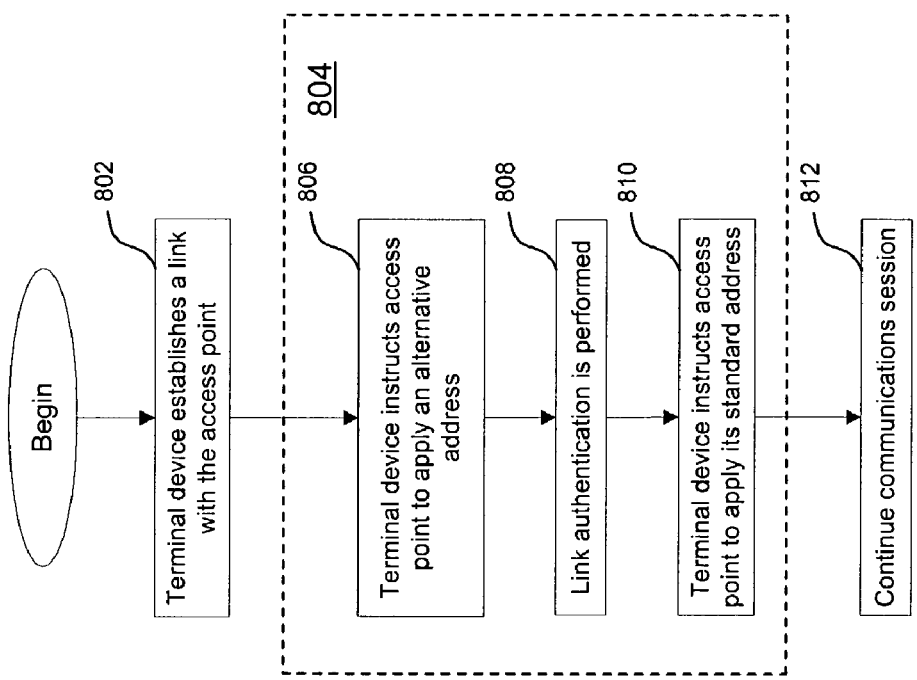
FIG. 8 is a flowchart of a handover operation performed by a roaming terminal device according to an embodiment of the present invention.

Accordingly, FIGS. 7 and 8 are flowcharts that illustrate streamlined access point roaming from different perspectives. In particular, FIG. 7 illustrates the perspective of a current access point acquiring a terminal device connection from a previous access point. FIG. 8 illustrates the perspective of a terminal device that is engaged in a handover from a first access point to a second access point. It is important to note that the steps of FIGS. 7 and 8 may be performed in sequences other than the ones shown.

FIG. 7 is a flowchart of a handover operation performed by an access point according to an embodiment of the present invention, such as access point 406, into which a terminal device, such as terminal device 402, is roaming. This operation is described with reference to the operational scenario of FIG. 4. The process shown in FIG. 7 begins with a step 702. In this step, access point 406 receives a handover notification from access point 404.

This handover notification may include various types of information. For example, it may include the address of terminal device 402. The handover notification may also include an access point address, such as the address of access point 404. Alternatively, this notification may include a random access point address created by the terminal device 402 during a connection with a prior access point. The transmission of such access point addresses enables access point 406 to page terminal 402 with an address for which terminal device 402 has the corresponding link key.

Access point 404 may transmit this handover notification to access points in addition to access point 406. For example, access point 404 may transmit this handover notification to all access points (including access point 406) within a predetermined range.

A step 703 follows step 702. In this step, access point 406 obtains a group key for terminal device 402. With reference to the environment of FIG. 1, this step may comprise transmitting a query to link management database 112 and receiving a response from link management database 112 that contains this group key. Alternatively, this step may comprise obtaining the group key from a local database within access point 406. In a further alternative, step 703 comprises obtaining the group key from access point 404, either through a request from access point 406 or as part of the handover notification received in step 402.

Next, in a step 704, access point 406 establishes a link with terminal device 402. This step may comprise performing a paging process, such as the Bluetooth paging process described above with reference to FIG. 5.

A step 706 follows step 704. In this step, access point 404 authenticates the link that was established with terminal device 402 in step 704. FIG. 7 shows that step 706 includes steps 708 through 712. In step 708, access point 406 interrupts links with one or more terminal devices other than terminal device 402. This step may comprise access point 406 placing these other terminal devices in an operational mode, such as the Bluetooth connection hold mode.

Next, in step 710, access point 406 receives a directive from terminal device 402 to apply an alternative address for link authentication purposes. This alternative address is an address that is different from the address of access point 406. For example, this alternative address may be the address of the previous access point (i.e., the address of access point 404). Alternatively, this alternative address may be a random address created by terminal device 402 during initiation of a prior access point connection, such as the first access point connection of the pending communications session.

The scenario where terminal device 402 initially applies this random address for the access point may occur in the following manner. First, terminal device 402 creates link level connection to an access point. Next, terminal device 402 generates a random address (e.g., a BD_ADDR) and requests the first access point to apply it. Authentication is then performed using this random address. After authentication, the access point that its address is changed back to its original address. From this on, the random access point address may be applied in handovers.

Using a group key that is associated with a random access point address, eliminates the situation where two access points simultaneously employ the same address. This advantageously reduces the possibility of neighboring access points interfering with each other when using the same address.

In step 712, access point 406 performs an authentication process with terminal device 402 using a key that corresponds to the alternative access point address and the group key obtained in step 703. Since terminal device 402 knows the key that corresponds to the alternative address, terminal device 402 and access point 406 do not have to perform a pairing process.

After authentication, access point 406 can change its address back to its original address. Accordingly, a step 713 follows step 706. In this step, access point 406 receives a directive from terminal device 402 to apply its standard address. In the context of Bluetooth, this standard address is the BD_ADDR address assigned to access point 406. Alternatively, step 713 may comprise access point 406 transmitting a message to terminal device 402 that requests approval to apply its standard address. In this case, step 713 also comprises receiving an approval message from terminal device 402. This approval message authorizes access point 406 to apply its standard address.

A step 714 follows step 713. In step 714, access point 406 applies its standard address and resumes the links that it interrupted with any other terminal devices in step 708. Accordingly, step 714 may comprise access point 406 placing these other terminal devices in an operational mode, such as a Bluetooth active connection mode. Next, in a step 716, the communication session of terminal device 402 is continued.

FIG. 8 is a flowchart of a handover operation performed by a roaming terminal device, such as terminal device 402, according to an embodiment of the present invention. Like FIG. 7, this operation is described with reference to the operational scenario of FIG. 4. The process shown in FIG. 8 begins with a step 802. In this step, terminal device 402 establishes a link with access point 406. This step may comprise engaging in a paging process, such as the Bluetooth paging process described above with reference to FIG. 5.

Next, in a step 804, terminal device 402 engages in an authentication process with access point 406. This process authenticates the link that was established with access point 404 in step 802. FIG. 8 shows that step 804 includes steps 806 and 808. In step 806, terminal device 402 transmits a directive to access point 406. This directive instructs access point 406 to apply an alternative address for link authentication purposes.

This alternative address is an address that is different from the address of access point 406. For example, this alternative address may be the address of the previous access point (i.e., the address of access point 404). Alternatively, this alternative address may be a random address created by terminal device 402 during initiation of a connection with a prior access point, such as the first access point connection of the pending communications session.

In step 808, access point 406 authenticates the link established with terminal device 402 using a key that corresponds to the alternative access point address and a group key associated with terminal device 402. Since terminal device 402 knows the key that corresponds to the alternative address, terminal device 402 and access point 406 do not have to perform a pairing process.

In a step 810, terminal device 402, transmits a directive that instructs access point 406 to apply its standard address. In the context of Bluetooth, this standard address is the BD_ADDR address assigned to access point 406. In addition, step 810 may include receiving a message from access point 406 that indicates it approved this directive. Alternatively, step 810 may comprise access point 406 transmitting a message that requests such an address change, and terminal device 402 responding with approval of this requested change.

A step 812 follows step 810. In step 812, the communication session of terminal device 402 is continued.

Figure 9:
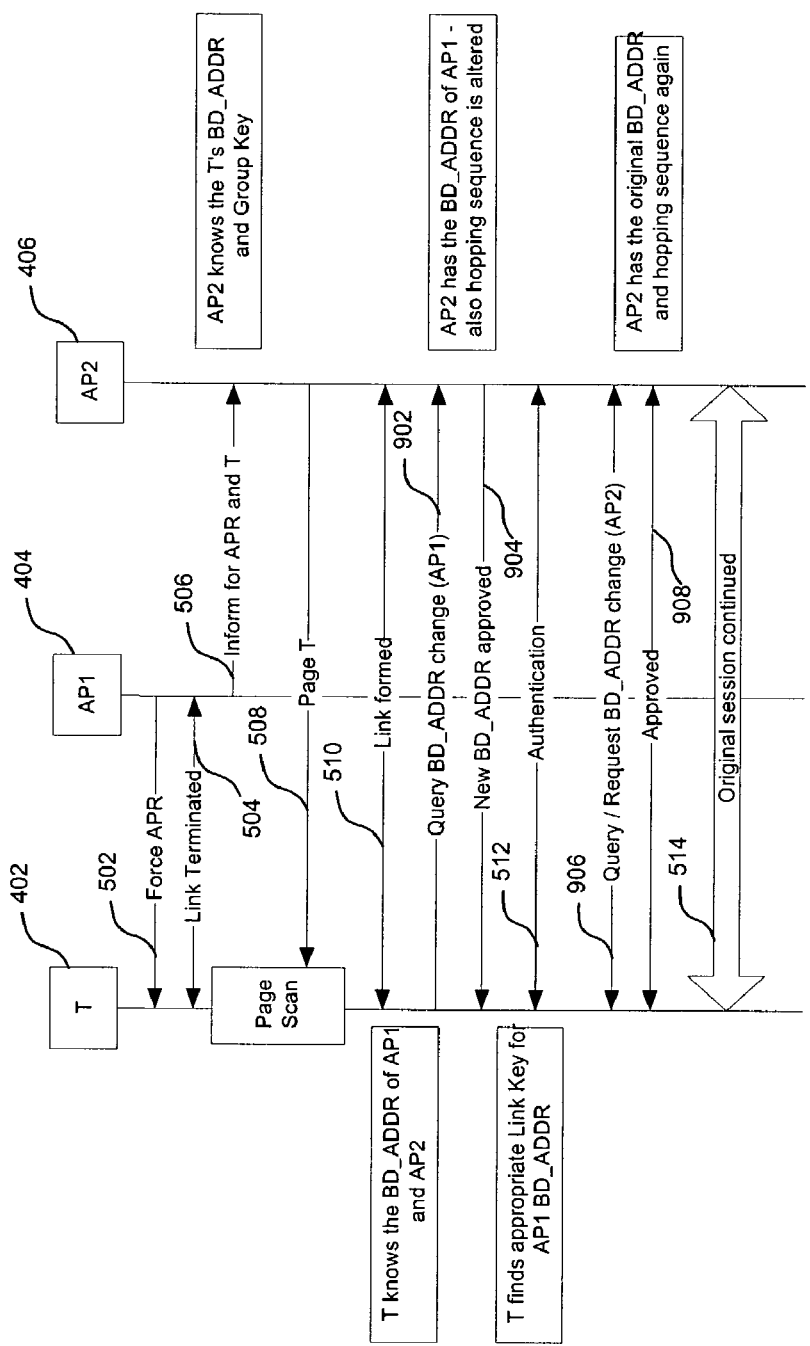
FIG. 9 is a diagram of a signaling sequence in a handover process that eliminates the need for full authentication and pairing according to an embodiment of the present invention.

FIG. 9 is a diagram of a signaling sequence in accordance with the operations described above with reference to FIGS. 7 and 8. This signaling sequence eliminates the need for full authentication and pairing. In particular, FIG. 9 illustrates a series of steps that shows how terminal device 402 interacts with access points 404 and 406 during an access point initiated handover according to an embodiment of the present invention. FIG. 9 is similar to FIG. 5. However, FIG. 9 shows additional steps that are not includes in FIG. 5.

In addition, step 506 may further comprise access point 404 notifying access point 406 (as well as possibly other access points within a predetermined range) of either the random address (established by terminal device 402 during a prior connection setup) or the standard address of access point 404. This enables access points to page terminal device with this address (for which terminal device 402 already has the link key).

In a step 902, terminal device 402 requests an address change after a link is formed in step 510. Next, in a step 904, access point 406 sends a message approving this address change. FIG. 9 shows the address of access point 406 being changed to the address of access point 404. However, other alternative addresses may be employed.

Step 512 follows step 904. In this step, the link between access point 406 and terminal device 402 is authenticated. However, unlike the authentication described with reference to FIG. 6, this authentication process is based on the alternative access point address requested in step 902.

After authentication, a step 906 is performed. In this step, a request is placed to change the address of access point 406 to its assigned address. This step may comprise access point 406 sending a request message to terminal device 402. Alternatively, this step may comprise terminal device 402 sending a request message to access point 406.

Next, in a step 908, the request made in step 906 is approved. This approval may be made by either terminal device 402 or access point 406. In particular, step 908 may comprise terminal device 402 sending an approval message to access point 406. Alternatively, step 908 may comprise access point 406 sending an approval message to terminal device 402. As a result of step 908, access point 406 resumes the use of its assigned address.

Step 514 follows step 908. As described above with reference to FIG. 5, terminal device 402 continues its communications session in this step.

Although this signaling sequence is described with reference to the elements of FIG. 4, this illustrated process may be applied to other scenarios and topologies.

V. Multiple Device Access Point Implementations

Figure 10:
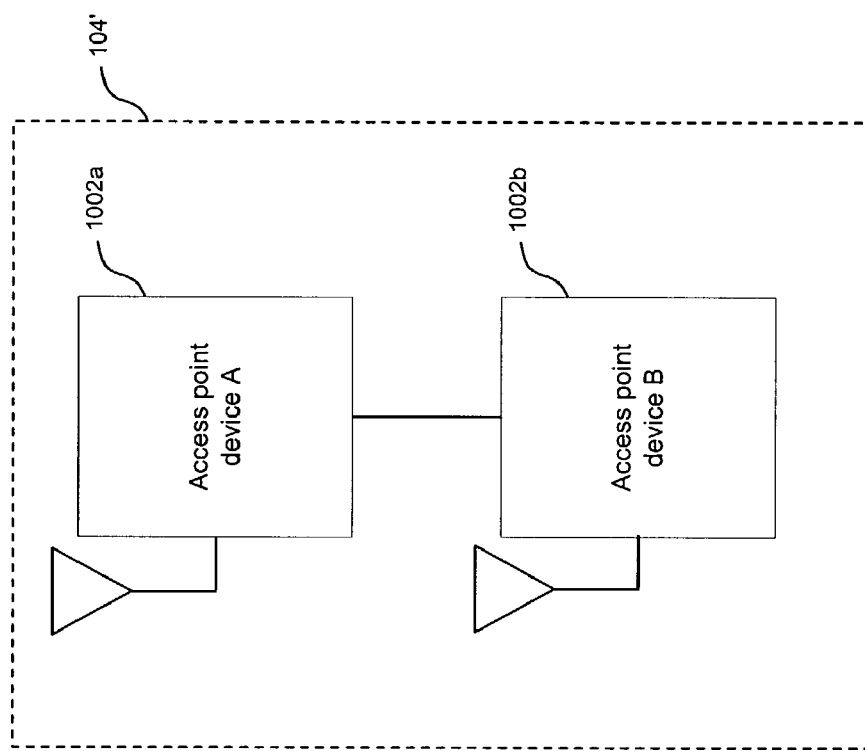
FIG. 10 is a block diagram of a multiple device access point implementation according to an embodiment of the present invention.
Figure 10:
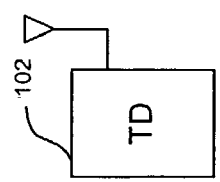

FIG. 10 is a block diagram of a multiple device access point implementation 104' according to an embodiment of the present invention. This implementation includes coupled first and second device 1002a and 1002b (e.g., Bluetooth modules). Each of devices 1002 may be implemented as described above with reference to FIG. 3. These devices may be coupled according to various techniques, such as local area networks, computer interfaces, and/or other techniques apparent to persons skilled in the relevant arts.

Devices 1002 may each perform dedicated functions. For example, device 1002a may serve ongoing terminal device connections, while device 1002b may actively seek new terminal device connections. As described above with reference to FIGS. 7 and 9, an access point may place certain connections in a hold or park mode when receiving a terminal device handover. By providing at least two of these "dedicated" devices, handovers may be performed without placing existing terminal device connections in such a hold or park mode.

Figure 11:
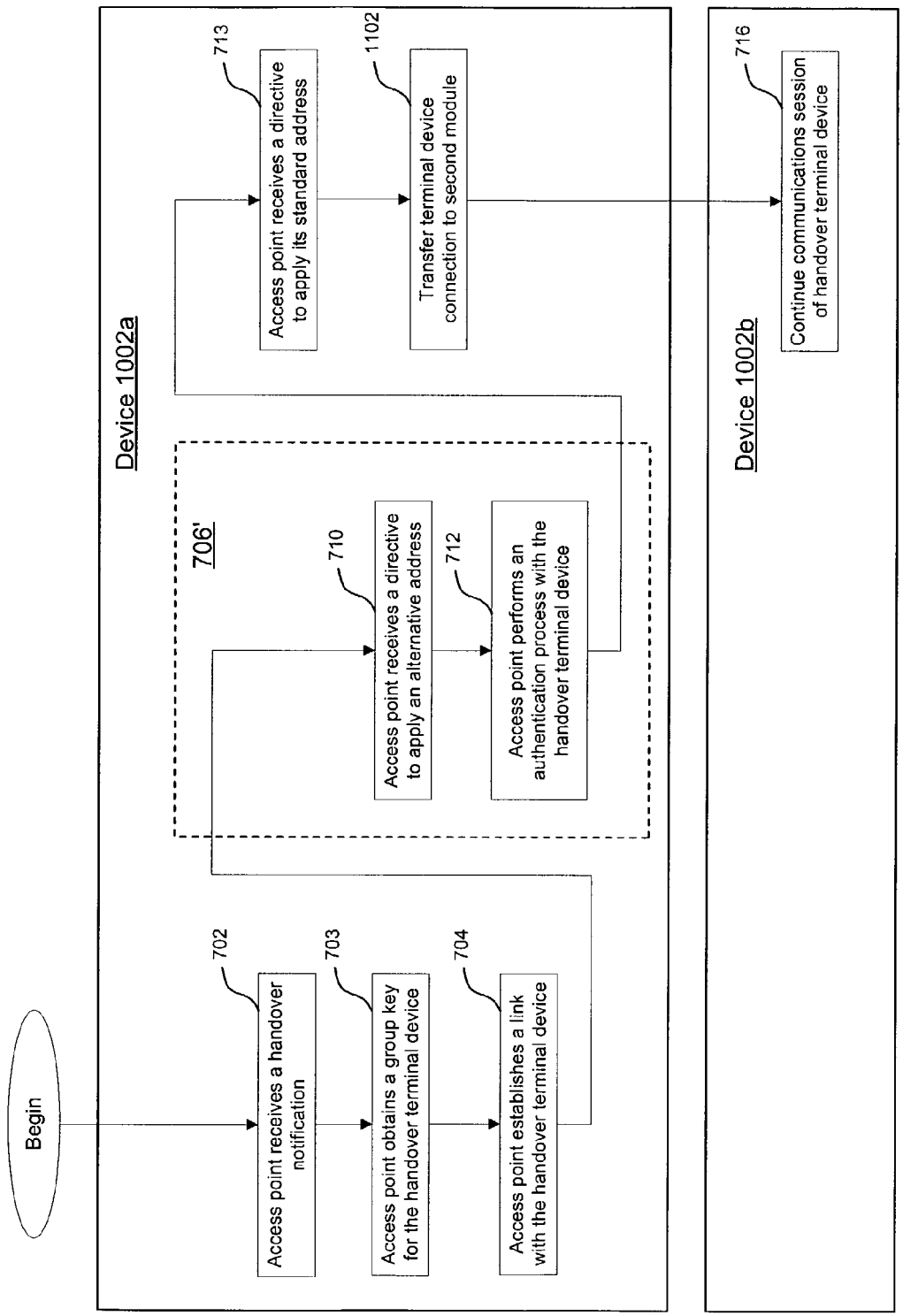
FIG. 11 is a flowchart of a handover operation performed by a multiple device access point implementation according to an embodiment of the present invention.

FIG. 11 is a flowchart of a handover operation according to an embodiment of the present invention performed by a multiple device access point implementation, such as the implementation shown in FIG. 10. This flowchart is similar to the flowchart of FIG. 7. However, this flowchart does not include steps 708 and 714. Moreover, this flowchart includes a step 1102 that is not present in FIG. 7. As shown in FIG. the steps in this operation may be allocated between devices 1002a and 1002b. In particular, FIG. 11 shows that steps 702–713, and 1102 are performed by device 1002a, while step 716 is performed by device 1002b. However, other allocations may be employed.

The steps of FIG. 11 are described with reference to the operational scenario of FIG. 4. However, these steps may be performed in other scenarios. As shown in FIG. 11, device 1002a receives a handover notification from the previous access point. Next, in step 703, device 1002a obtains a group key for terminal device 402. Step 704 follows step 703. In this step, device 1002a establishes a link with terminal device 402.

After step 704, module 1002a performs a step 706'. Unlike step of 706 in FIG. 7, step 706' does not include step 708. That is, step 706' does not include interrupting links with other terminal devices. However, step 706' includes steps 710 and 712. In step 710, module 1002a receives a directive from terminal device 402 to apply an alternative address for link authentication purposes. This alternative address is an address that is different from the address of access point 406. For example, this alternative address may be the address of the previous access point (i.e., the address of access point 404). Alternatively, this alternative address may be a random address created by terminal device 402 during initiation of a prior access point connection, such as the first access point connection of the pending communications session.

In step 712, device 1002 performs an authentication process with terminal device 402 using a key that corresponds to the alternative access point address and the group key obtained in step 703. Since terminal device 402 knows the key that corresponds to the alternative address, terminal device 402 and access point 406 do not have to perform a pairing process.

After step 706', module 1002a performs step 713. In this step, device 1002a receives a directive from terminal device 402 to apply its standard address. In the context of Bluetooth, this standard address is the BD_ADDR address assigned to device 1002a. Alternatively, step 713 may comprise access point 406 transmitting a message to terminal device 402 that requests approval to apply its standard address. In this case, step 713 also comprises receiving an approval message from terminal device 402. This approval message authorizes access point 406 to apply its standard address.

Next, device 1002a performs step 1102. In this step, device 1002a transfers the terminal device connection to module 1002b. In step 1102, device 1002a passes or transfers the connection with terminal device 402 in step 127 to device 1002b. To transfer this connection in a Bluetooth environment, device 1002a must establish a connection with terminal device 402 that employs a frequency hop sequence synchronized with the frequency hop sequence employed by device 1002b.

To accomplish this, device 1002a performs some special operations in step 704. In particular, device 1002a sends an FHS paging packet to terminal device 402 that provides the timing information and access code of device 1002b. This FHS packet also contains a new active member address (AM_ADDR) assigned to terminal device 402. This address is the next available slave-member number for the network of connections managed by device 1002b. By doing this, both device 1002a and the terminal device 402 have the frequency hop sequence of device 1002b.

In step 1102, device 1002a transfers the connection formed with terminal device 402 in step 704 to device 1002b. In the context of Bluetooth, this step includes sending device 1002b the active member address (AM_ADDR) assigned to terminal device 402 in step 704. Thus, terminal device 402 becomes a slave device to device 1002b. Accordingly, in step 716, the communication session of terminal device 402 is continued.

Further details regarding the transfer of connections between devices are provided in U.S. application Ser. No. 10/072,969, filed Feb. 12, 2002, and entitled "Short-Range RF Access Point Design Enabling Services to Master and Slave Mobile Devices." This application is incorporated herein by reference in its entirety.

Following step 1102, operation proceeds to step 716, where device 1002b continues the communications session of terminal device 402.

Although FIG. 10 illustrates a two-device access point implementation, other implementations may employ various numbers of devices. For example, implementations may include three devices that each handle dedicated functions. Details regarding such implementations are found in U.S. application Ser. No. 10/072,969.

VI. Computer System

Figure 12:
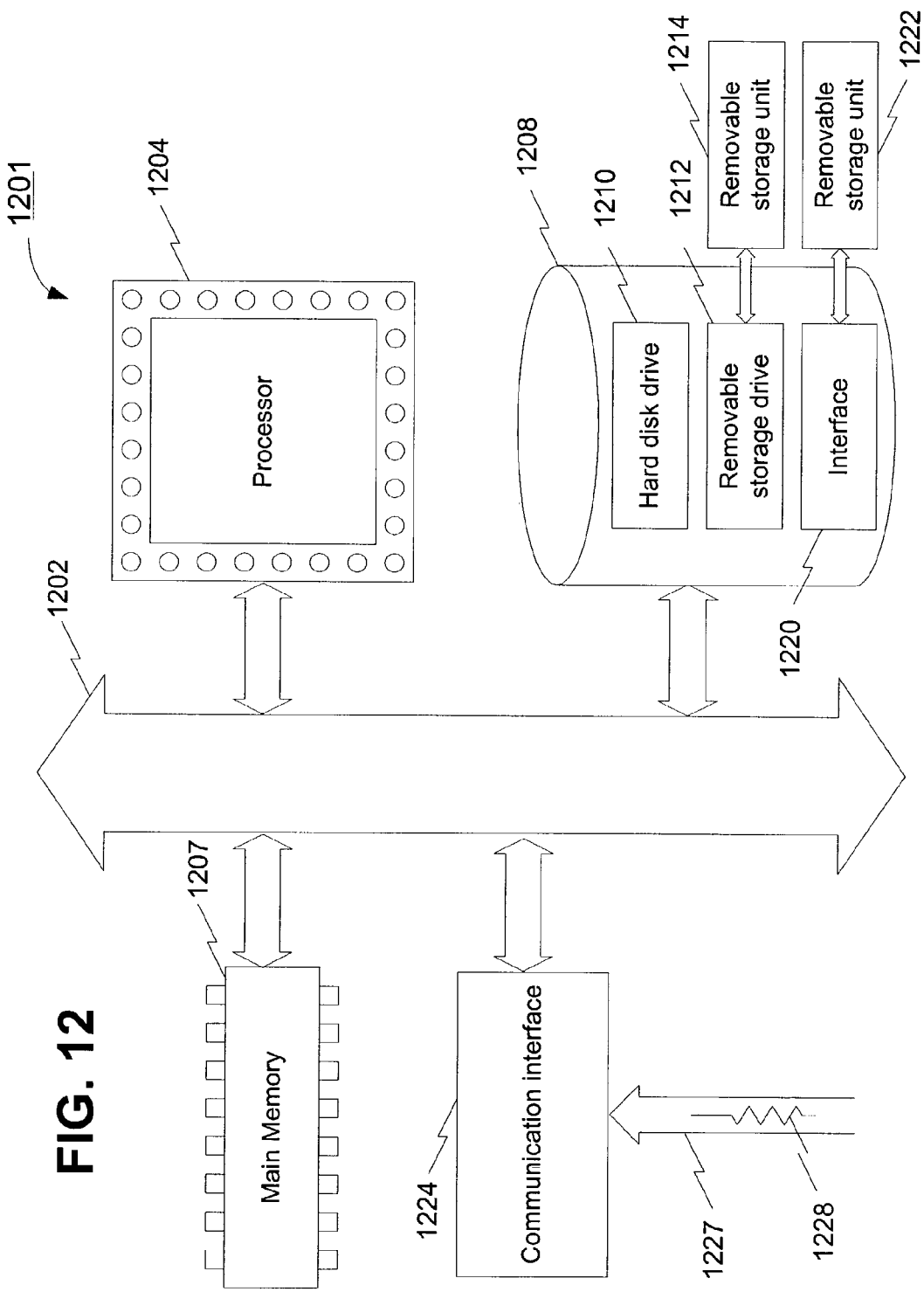
FIG. 12 is a block diagram of a computer system.

The access point devices and terminal devices described herein may implemented with one or more computer systems. An example of a computer system 1201 is shown in FIG. 12. Computer system 1201 represents any single or multi-processor computer. Single-threaded and multi-threaded computers can be used. Unified or distributed memory systems can be used.

Computer system 1201 includes one or more processors, such as processor 1204. One or more processors 1204 can execute software implementing the process described above with reference to FIGS. 3, 4, 5, 7, and 8. Each processor 1204 is connected to a communication infrastructure 1202 (for example, a communications bus, cross-bar, or network). Various software embodiments are described in terms of this exemplary computer system. After reading this description, it will become apparent to a person skilled in the relevant art how to implement the invention using other computer systems and/or computer architectures.

Computer system 1201 also includes a main memory 1207 which is preferably random access memory (RAM). Computer system 1201 may also include a secondary memory 1208. Secondary memory 1208 may include, for example, a hard disk drive 1210 and/or a removable storage drive 1212, representing a floppy disk drive, a magnetic tape drive, an optical disk drive, etc. Removable storage drive 1212 reads from and/or writes to a removable storage unit 1214 in a well known manner. Removable storage unit 1214 represents a floppy disk, magnetic tape, optical disk, etc., which is read by and written to by removable storage drive 1212. As will be appreciated, the removable storage unit 1214 includes a computer usable storage medium having stored therein computer software and/or data.

In alternative embodiments, secondary memory 1208 may include other similar means for allowing computer programs or other instructions to be loaded into computer system 740. Such means can include, for example, a removable storage unit 1222 and an interface 1220. Examples can include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1201.

Computer system 1201 may also include a communications interface 1224. Communications interface 1224 allows software and data to be transferred between computer system 1201 and external devices via communications path 1227. Examples of communications interface 1227 include a modem, a network interface (such as Ethernet card), a communications port, etc. Software and data transferred via communications interface 1227 are in the form of signals 228 which can be electronic, electromagnetic, optical or other signals capable of being received by communications interface 1224, via communications path 1227. Note that communications interface 1224 provides a means by which computer system 1201 can interface to a network such as the Internet.

The present invention can be implemented using software running (that is, executing) in an environment similar to that described above with respect to FIG. 12. In this document, the term "computer program product" is used to generally refer to removable storage units 1214 and 1222, a hard disk installed in hard disk drive 1210, or a signal carrying software over a communication path 1227 (wireless link or cable) to communication interface 1224. A computer useable medium can include magnetic media, optical media, or other recordable media, or media that transmits a carrier wave or other signal. These computer program products are means for providing software to computer system 1201.

Computer programs (also called computer control logic) are stored in main memory 1207 and/or secondary memory 1208. Computer programs can also be received via communications interface 1224. Such computer programs, when executed, enable the computer system 1201 to perform the features of the present invention as discussed herein. In particular, the computer programs, when executed, enable the processor 1204 to perform the features of the present invention. Accordingly, such computer programs represent controllers of the computer system 1201.

The present invention can be implemented as control logic in software, firmware, hardware or any combination thereof. In an embodiment where the invention is implemented using software, the software may be stored in a computer program product and loaded into computer system 1201 using removable storage drive 1212, hard drive 1210, or interface 1220. Alternatively, the computer program product may be downloaded to computer system 1201 over communications path 1227. The control logic (software), when executed by the one or more processors 1204, causes the processor(s) 1204 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

VII. Conclusion

While various embodiments of the present invention have been described above, it should be understood that they have been presented by way of example only, and not limitation. For instance, the present invention is not limited to Bluetooth. Furthermore, the present invention can be applied to previous and future developed Bluetooth standards, as well as variations from such Bluetooth standards.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, in a terminal device, of handing over a wireless communications session from a first access point to a second access point, the method comprising:
   (a) establishing a link with the second access point;
   (b) authenticating the link with the second access point using an alternative access point address determined by the terminal device and a group key associated with the terminal device, wherein the alternative access point address is different than a standard address of the second access point and an address of the terminal device; and
   (c) continuing the communications session with the second access point using the standard address of the second access point.

2. The method of claim 1, wherein the alternative access point address is an address of the first access point.

3. The method of claim 1, wherein the alternative access point address is a random address created by the terminal device during initiation of a prior access point connection.

4. The method of claim 1, wherein step (b) comprises transmitting a directive to the second access point to employ the alternative access point address.

5. The method of claim 1, wherein the link is a short range radio link.

6. The method of claim 1, wherein the link is a Bluetooth link.

7. A terminal device that is capable of handing over a wireless communications session from a first access point to a second access point, the terminal device comprising:
   means for establishing a link with the second access point;
   means for authenticating the link with the second access point using an alternative access point address determined by the terminal device and a group key associated with the terminal device, wherein the alternative access point address is different than a standard address of the second access point and an address of the terminal device; and means for continuing the communications session with the second access point using the standard address of the second access point.

8. The terminal device of claim 7 wherein the alternative access point address is an address of the first access point.

9. The terminal device of claim 7, wherein the alternative access point address is a random address created by the terminal device during initiation of a prior access point connection.

10. The terminal device of claim 7, wherein said authenticating means comprises means for transmitting a directive to the second access point to employ the alternative access point address.

11. The terminal device of claim 7, wherein the link is a short range radio link.

12. The terminal device of claim 7, wherein the link is a Bluetooth link.

13. A method, in a current access point, of handing over a wireless communications session with a terminal device from a previous access point, the method comprising:
(a) establishing a link with the terminal device;
(b) authenticating the link with the terminal device using an alternative access point address determined by the terminal device and a group key based on a terminal device address, wherein the alternative access point address is different than a standard address of the current access point and an address of the terminal device; and
(c) continuing the communications session with the terminal device using a standard address of the current access point.

14. The method of claim 13, wherein the alternative access point address is an address of the previous access point.

15. The method of claim 13, wherein the alternative access point address is a random address created by the terminal device during initiation of a prior access point connection.

16. The method of claim 13, further comprising the step of retrieving the group key from a remote database.

17. The method of claim 13, further comprising the step of receiving a handover notification from the first access point.

18. The method of claim 17, wherein the handover notification includes the terminal device address.

19. The method of claim 17, wherein the handover notification includes the alternative access point address.

20. The method of claim 13, wherein step (b) comprises receiving a directive from the terminal device to employ the alternative access point address.

21. The method of claim 13, wherein step (b) comprises interrupting links with one or more other terminal devices.

22. The method of claim 13, wherein step (b) comprises placing the one or more other terminal devices in a connection hold mode.

23. The method of claim 13, wherein steps (a) and (b) are performed by a first access point device, and wherein step (c) is performed by a second access point device.

24. The method of claim 13, wherein the link is a short range radio link.

25. The method of claim 13, wherein the link is a Bluetooth link.

26. An access point that is capable of handing over a wireless communications session with a terminal device from a previous access point, the access point comprising:
means for establishing a link with the terminal device;
means for authenticating the link with the terminal device using an alternative access point address determined by the terminal device and a group key based on a terminal device address, wherein the alternative access point address is different than a standard address of the access point and an address of the terminal device; and
means for continuing the communications session with the terminal device using a standard address of the access point.

27. The access point of claim 26, wherein the alternative access point address is an address of the previous access point.

28. The access point of claim 26, wherein the alternative access point address is a random address created by the terminal device during initiation of a prior access point connection.

29. The access point of claim 26, further comprising means for retrieving the group key from a remote database.

30. The access point of claim 26, further comprising means for receiving a handover notification from the first access point.

31. The access point of claim 30, wherein the handover notification includes the terminal device address.

32. The access point of claim 30, wherein the handover notification includes the alternative access point address.

33. The access point of claim 26, wherein said authenticating means comprises means for receiving a directive from the terminal device to employ the alternative access point address.

34. The access point of claim 26, wherein said authenticating means comprises means for interrupting links with one or more other terminal devices.

35. The access point of claim 26, wherein said authenticating means comprises means for placing the one or more other terminal devices in a connection hold mode.

36. The access point of claim 26, wherein said means for establishing a link and said authenticating means are included a first access point device, and wherein said means for continuing the communications session is included in a second access point device that is coupled to the first access point device.

37. The access point of claim 26, wherein said link is a short range radio link.

38. The access point of claim 26, wherein said link is a Bluetooth link.

39. A method, in a terminal device, of handing over a wireless communications session from a first access point to a second access point, the method comprising:
(a) entering a first coverage area associated with the first access point;
(b) establishing a first link with the first access point
(c) authenticating the first link with the first access point using an alternative access point address determined by the terminal device and a group key associated with the terminal device;
(d) establishing a communications session with the first access point using an address of the first access point;
(e) entering a second coverage area associated with the second access point;
(f) establishing a second link with the second access point;
(g) authenticating the second link with the second access point using the alternative access point address determined by the terminal device and the group key associated with the terminal device, wherein the alternative access point address is different than a standard address of the second access point and an address of the terminal device; and (h) continuing the communications session with the second access point using a standard address of the second access point.

40. A terminal device that is capable of handing over a wireless communications session from a first access point to a second access point, the terminal device comprising:

means for entering a first coverage area associated with the first access point;

means for establishing a first link with the first access point means for authenticating the first link with the first access point using an alternative access point address determined by the terminal device and a group key associated with the terminal device;

means for establishing a communications session with the first access point using an address of the first access point;

means for entering a second coverage area associated with the second access point;

means for establishing a second link with the second access point;

means for authenticating the second link with the second access point using the alternative access point address determined by the terminal device and the group key associated with the terminal device, wherein the alternative access point address is different than a standard address of the second access point and an address of the terminal device; and means for continuing the communications session with the second access point using a standard address of the second access point.

41. A computer program product comprising a computer useable medium having computer program logic recorded thereon for enabling a processor in a computer system of a terminal device to hand over a wireless communications session from a first access point to a second access point, the computer program logic comprising:

program code for enabling the processor to establish a link with the second access point;

program code for enabling the processor to authenticate the link with the second access point using an alternative access point address determined by the terminal device and a group key associated with the terminal device, wherein the alternative access point address is different than a standard address of the second access point and an address of the terminal device; and program code for enabling the processor to continue the communications session with the second access point using a standard address of the second access point.

42. A computer program product comprising a computer useable medium having computer program logic recorded thereon for enabling a processor in a computer system of an access point to hand over a wireless communications session with a terminal device from a previous access point, the computer program logic comprising:

program code for enabling the processor to establish a link with the terminal device;

program code for enabling the processor to authenticate the link with the terminal device using an alternative access point address determined by the terminal device and a group key based on a terminal device address, wherein the alternative access point address is different than a standard address of the access point and an address of the terminal device; and program code for enabling the processor to continue the communications session with the terminal device using a standard address of the access point.

* * * * *